US009514555B2

(12) United States Patent
Fraser et al.

(10) Patent No.: US 9,514,555 B2
(45) Date of Patent: Dec. 6, 2016

(54) METHOD OF RENDERING AN OVERLAPPING REGION

(71) Applicant: CANON KABUSHIKI KAISHA, Tokyo (JP)

(72) Inventors: Thomas Grant Fraser, Edmonds, WA (US); Joseph Leigh Belbin, Mount Colah (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 526 days.

(21) Appl. No.: 14/037,762

(22) Filed: Sep. 26, 2013

(65) Prior Publication Data

US 2014/0118368 A1 May 1, 2014

(30) Foreign Application Priority Data

Sep. 28, 2012 (AU) .................................. 2012232989

(51) Int. Cl.
| | |
|---|---|
| *G09G 5/377* | (2006.01) |
| *G09G 5/02* | (2006.01) |
| *G06T 11/60* | (2006.01) |
| *G06T 15/50* | (2011.01) |

(52) U.S. Cl.
CPC ............ *G06T 11/60* (2013.01); *G06T 15/503* (2013.01); *G09G 5/026* (2013.01); *G09G 5/377* (2013.01); *G06T 2210/62* (2013.01); *G09G 2340/10* (2013.01)

(58) Field of Classification Search
None
See application file for complete search history.

(56) References Cited

U.S. PATENT DOCUMENTS

| | | | | |
|---|---|---|---|---|
| 5,454,076 | A | * | 9/1995 | Cain ...................... G09G 5/393 345/531 |
| 6,151,030 | A | | 11/2000 | DeLeeuw et al. |
| 6,392,643 | B1 | * | 5/2002 | Furuhashi ............. G06T 15/503 345/419 |
| 6,992,677 | B2 | | 1/2006 | Hsieh |
| 7,215,342 | B2 | | 5/2007 | Zhu |
| 7,280,120 | B2 | * | 10/2007 | Ecob ..................... G06T 15/503 345/422 |
| 7,821,521 | B2 | | 10/2010 | Jackson |
| 7,982,746 | B2 | | 7/2011 | Long |
| 2004/0174371 | A1 | * | 9/2004 | Hsieh ........................ G06T 1/60 345/522 |
| 2010/0315431 | A1 | * | 12/2010 | Smith ..................... G06T 11/20 345/619 |
| 2011/0279471 | A1 | * | 11/2011 | Roskind ............. G06F 21/6254 345/582 |

(Continued)

*Primary Examiner* — Joni Richer

(74) *Attorney, Agent, or Firm* — Canon USA, Inc. IP Division

(57) ABSTRACT

Disclosed is a method of modifying a graphics command. The method receives a graphics command comprising a drawing operation and a pattern (ROP3) of the region and obtains spatial frequencies of the pattern. The method determines if the obtained spatial frequencies of the pattern in the graphics command define a transparency attribute of the region to be rendered and replaces at least the pattern in the graphics command with a transparency coefficient based on the obtained spatial frequencies.

16 Claims, 14 Drawing Sheets

(56) References Cited

U.S. PATENT DOCUMENTS

2012/0050765 A1* 3/2012 Mori ................. G06K 15/1868
358/1.9
2012/0300229 A1* 11/2012 Kuo ..................... G06K 1/121
358/1.9

* cited by examiner

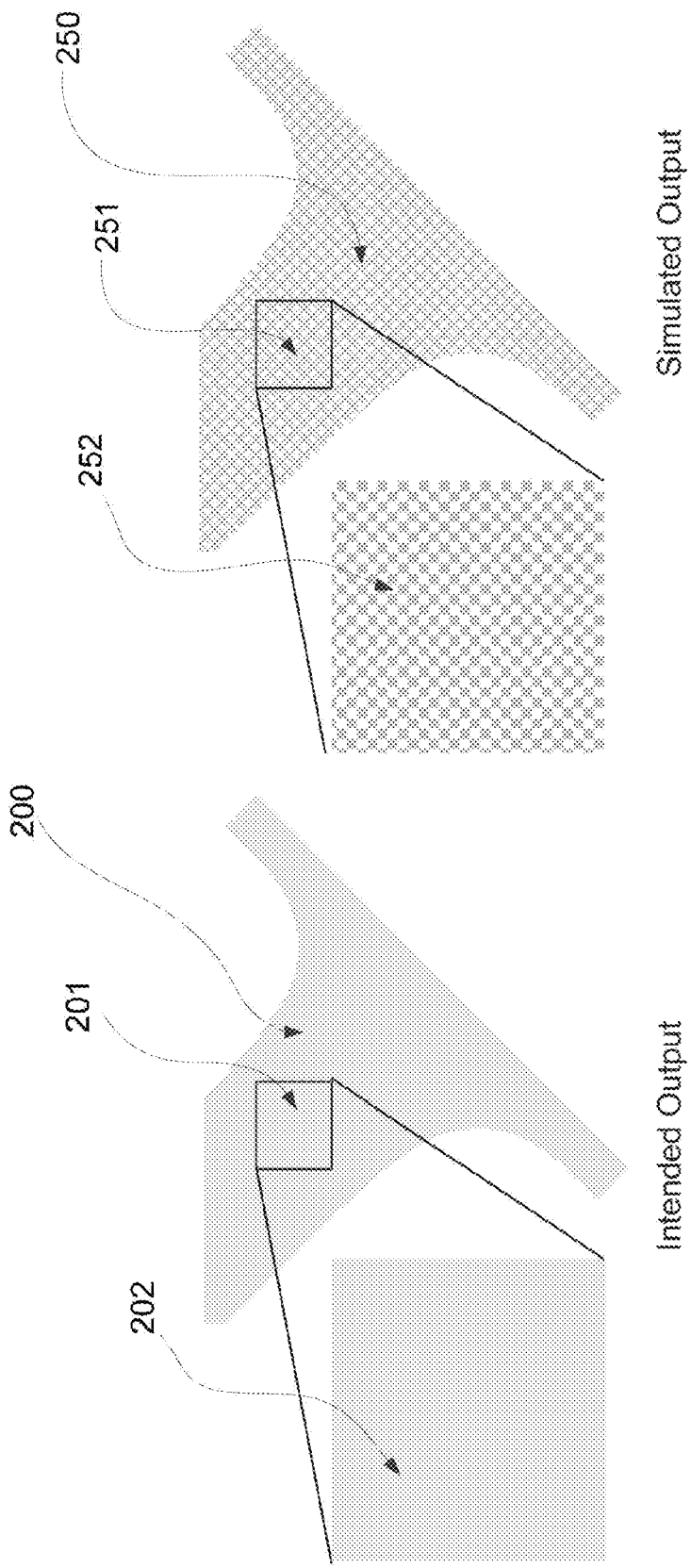

$$\begin{bmatrix}
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1 \\
1 & 0 & 1 & 0 & 1 & 0 & 1 & 0 & 1 & 0 & 1 & 0 & 1 & 0 & 1 & 0 \\
0 & 1 & 0 & 1 & 0 & 1 & 0 & 1 & 0 & 1 & 0 & 1 & 0 & 1 & 0 & 1
\end{bmatrix}$$

Fig. 13A $$\begin{bmatrix}
8.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.1 & 0.0 & 0.1 & 0.0 & 0.1 & 0.0 & 0.1 & 0.0 & 0.2 & 0.0 & 0.6 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.1 & 0.0 & 0.1 & 0.0 & 0.1 & 0.0 & 0.1 & 0.0 & 0.2 & 0.0 & 0.7 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.1 & 0.0 & 0.1 & 0.0 & 0.1 & 0.0 & 0.2 & 0.0 & 0.2 & 0.0 & 0.7 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.1 & 0.0 & 0.1 & 0.0 & 0.1 & 0.0 & 0.2 & 0.0 & 0.3 & 0.0 & 0.8 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.1 & 0.0 & 0.1 & 0.0 & 0.2 & 0.0 & 0.2 & 0.0 & 0.3 & 0.0 & 1.0 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.1 & 0.0 & 0.2 & 0.0 & 0.2 & 0.0 & 0.2 & 0.0 & 0.3 & 0.0 & 0.5 & 0.0 & 1.4 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.2 & 0.0 & 0.2 & 0.0 & 0.2 & 0.0 & 0.3 & 0.0 & 0.3 & 0.0 & 0.5 & 0.0 & 0.7 & 0.0 & 2.2 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.6 & 0.0 & 0.7 & 0.0 & 0.7 & 0.0 & 0.8 & 0.0 & 1.0 & 0.0 & 1.4 & 0.0 & 2.2 & 0.0 & 6.5
\end{bmatrix}$$

Fig. 13B $$\begin{bmatrix}
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1 \\
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
1 & 1 & 1 & 1 & 0 & 0 & 0 & 0 & 1 & 1 & 1 & 1 & 0 & 0 & 0 & 0 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1 \\
0 & 0 & 0 & 0 & 1 & 1 & 1 & 1 & 0 & 0 & 0 & 0 & 1 & 1 & 1 & 1
\end{bmatrix}$$

Fig. 14A

$$\begin{bmatrix}
8.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 1.1 & 0.0 & 2.2 & 0.0 & 1.4 & 0.0 & 0.2 & 0.0 & 0.1 & 0.0 & 0.7 & 0.0 & 0.7 & 0.0 & 0.1 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 2.2 & 0.0 & 4.3 & 0.0 & 2.7 & 0.0 & 0.3 & 0.0 & 0.3 & 0.0 & 1.4 & 0.0 & 1.3 & 0.0 & 0.2 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 1.4 & 0.0 & 2.7 & 0.0 & 1.6 & 0.0 & 0.2 & 0.0 & 0.2 & 0.0 & 0.9 & 0.0 & 0.8 & 0.0 & 0.1 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.2 & 0.0 & 0.3 & 0.0 & 0.2 & 0.0 & 0.0 & 0.0 & 0.0 & 0.0 & 0.1 & 0.0 & 0.1 & 0.0 & 0.0 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.1 & 0.0 & 0.3 & 0.0 & 0.2 & 0.0 & 0.0 & 0.0 & 0.0 & 0.0 & 0.1 & 0.0 & 0.1 & 0.0 & 0.0 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.7 & 0.0 & 1.4 & 0.0 & 0.9 & 0.0 & 0.1 & 0.0 & 0.1 & 0.0 & 0.5 & 0.0 & 0.4 & 0.0 & 0.1 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.7 & 0.0 & 1.3 & 0.0 & 0.8 & 0.0 & 0.1 & 0.0 & 0.1 & 0.0 & 0.4 & 0.0 & 0.4 & 0.0 & 0.1 \\
0.0 & 0.0 & 0.0 & 0.0 & 0.0 & 0.0 & 0.0 & 0.0 & 0.0 & 0.0 & 0.0 & 0.0 & 0.0 & 0.0 & 0.0 & 0.0 \\
0.0 & 0.0 & 0.0 & 0.2 & 0.0 & 0.1 & 0.0 & 0.0 & 0.0 & 0.0 & 0.0 & 0.1 & 0.0 & 0.1 & 0.0 & 0.0
\end{bmatrix}$$

Fig. 14B

$$\begin{bmatrix}
1 & 1 & 1 & 1 & 0 & 0 & 0 & 0 \\
1 & 1 & 1 & 1 & 0 & 0 & 0 & 0 \\
1 & 1 & 1 & 1 & 0 & 0 & 0 & 0 \\
1 & 1 & 1 & 1 & 0 & 0 & 0 & 0 \\
0 & 0 & 0 & 0 & 1 & 1 & 1 & 1 \\
0 & 0 & 0 & 0 & 1 & 1 & 1 & 1 \\
0 & 0 & 0 & 0 & 1 & 1 & 1 & 1 \\
0 & 0 & 0 & 0 & 1 & 1 & 1 & 1
\end{bmatrix}$$

Fig. 14C

METHOD OF RENDERING AN OVERLAPPING REGION

RELATED APPLICATION

This application claims priority from Australian Patent Application No. 2012232989, filed Sep. 28, 2012, which is incorporated by reference herein in its entirety.

TECHNICAL FIELD

The present invention relates to the modification or simplification of graphics commands and, in particular, the processing of such commands to assist in the rendering of a region.

BACKGROUND

Drawing commands are the primitive instructions used by a computer application to display graphical representations of images. Drawing commands are rendered and displayed in Z-order (from bottom to top). Drawing commands define the characteristics of the object to be rendered, as well as its interaction with previously drawn (rendered) objects. Rendering systems may be implemented in specific hardware devices, configured either in computers or printers, or in software typically implemented in general purpose computers, or a combination of both.

Transparency is used to combine two objects into a single result. Typically transparency is specified in a separate channel known as the Alpha ($\alpha$) channel. The $\alpha$ channel specifies what percentage of the Drawing command will be visible versus what percentage of background, being that over which the Drawing command is rendered, will be visible.

Modern page description languages (PDLs), such as PDF, support an $\alpha$ channel for objects to allow them to be blended with objects below in the Z-order. When an object with transparency is given to a renderer, the renderer will typically blend or composite the object with its background using the following formula:

$$R_i = \alpha S_i + (1-\alpha) D_i \qquad \text{Equation 1}$$

where:
  $S_i$ is a channel from source object,
  $D_i$ is the corresponding channel of the destination (or background) prior to compositing,
  $\alpha$ is the Alpha value (from 0.0 to 1.0)
  $R_i$ is the corresponding channel of the result.

Using the above equation ensures that each pixel contains a contribution from both the object and the background proportionally based on the Alpha value.

However, some legacy drawing interfaces such as Graphics Device Interface (GDI) and Page Description Languages (PDLs) such as PostScript™ do not support transparency.

These interfaces for example can simulate transparency interleaving two objects together at a high resolution. Each pixel will either be from the object or from the background (no mixing per pixel), where the probability of using the object instead of the background is based on the percentage of transparency being simulated. For example with a 50% transparency, half of the pixels will be from the object and half the pixels from the background. With a 90% transparency, 10% of the pixels will be from the object and 90% of the pixels will be background. When the high resolution interleaved objects are viewed by the human eye, the objects will appear from a distance to be blended together.

Legacy applications, such as FrameMaker™ 5.0 (Adobe Corporation) and Word™ 2003 (Microsoft Corp.), use high resolution interleaving in order to simulate a transparency effect. However, this high resolution interleaving results in using a mask that adds artefacts to the output. The artefacts may be visible if the output is viewed closely or zoomed in. Also, the operation of interleaving may slow down the performance of the graphics renderer, as well as consume more memory.

Raster Operations (ROPs) are used in rendering to describe the relationship between source and destination components. Binary Raster Operations (ROP2s) involve two arguments (source, destination). Ternary Raster Operations (ROP3s) are used to combine a source image with a destination image using a pattern mask and binary operators. Binary operators are defined by ROP3 operation codes, which define the Boolean operation between the source image, the destination image and the pattern mask. For the purposes of interleaving pixels between source image and destination image, ROP3 with operation codes 0xCA and 0xAC are used.

Operation code 0xCA defines the following logic (in Reverse Polish Notation):
  DPSDxax Operation code 0xAC defines the following logic (in Reverse Polish Notation):
  SPDSxax where:
  S is the source image data;
  D is the destination image data;
  P is the pattern mask;
  x is an XOR operator; and
  a is an AND operator.

Operation code 0xCA for example may therefore be expressed traditionally as:

$$D \text{ XOR}(P \text{ AND}(S \text{ XOR } D)).$$

A ROP3 0xCA or ROP3 0xAC command will select either the source image or the destination image based on the pattern mask. For ROP3 0xCA, if the pattern mask is 1, the source image is selected otherwise the destination image is selected. For ROP3 0xAC, if the pattern mask is 1, the destination image is selected otherwise the source image is selected.

In complex rendering systems, graphics data must be compressed so that memory is not exhausted. This means that a rendering system will typically compress input images as they are received. The compression of image data is typically more efficient when the image data is converted into its spatial frequency coefficients. The Discrete Cosine Transform (DCT) provides a means of converting spatial data into spatial frequency coefficients. DCT is a subset of the Discrete Fourier Transform (DFT). It is commonly used in image processing methods to represent images since its values are easier to compress. Image processing systems typically convert pixel data to DCT to facilitate reduction of memory usage. The DCT is defined using the following equation:

$$F(s,t) = \frac{1}{\text{Max}(N,M)} \sum_{y=0}^{N-1} \sum_{x=0}^{M-1} f(x,y) \cos\left(\frac{\pi}{N}\left(y+\frac{1}{2}\right)s\right) \cos\left(\frac{\pi}{M}\left(x+\frac{1}{2}\right)t\right) \qquad \text{Equation 2}$$

where:
  N is the number of samples in the vertical direction
  M is the number of samples in the horizontal direction.
  Typically N and M are the same and the sample is a square.

Implementation of ROP3s involves retaining a state of the drawing commands, and then determining if the state defines transparency simulation. A problem with this approach is that it requires extra processing outside the normal rendering pipeline and extra memory to store the state information.

Furthermore, a drawing command may contain, for example, a raster (image) object with a large pattern of alternating tiles. The image may be thousands of pixels in width and height, but only have repeating tiles of 10s of pixels. Such an image typically consumes significant memory and thus may affect the performance of the renderer.

It is desirable to efficiently reverse or reduce the effects of transparency simulation. It is also desirable to simplify rendering of images with alternating tiles.

SUMMARY

According to one aspect of the present disclosure, there is provided a method of modifying a graphics command, the method comprising:

receiving a graphics command comprising a drawing operation and a pattern of the region;

calculating spatial frequencies of the pattern;

determining if the calculated spatial frequencies of the pattern in the graphics command defines a transparency attribute of the region to be rendered; and replacing at least the pattern in the graphics command with a transparency coefficient based on the calculated spatial frequencies.

Preferably the method further comprises rendering the region using the transparency coefficient.

Desirably the replacing step comprises replacing the graphics command with a binary ROP where the fill has the determined transparency value applied.

The replacing step may also or alternatively comprise determining that the transparency coefficient is transparent, and then removing the graphics command.

Similarly the replacing step may comprise determining that the transparency coefficient is opaque, and then removing the pattern (ROP3) thus modifying the object to be an opaque shape.

According to another aspect of the present disclosure, there is provided a method of modifying a graphics command, the method comprising:

receiving a graphics command comprising a drawing operation and a pattern (ROP3) of the region;

calculating spatial frequencies of the pattern;

determining if the calculated spatial frequencies of the pattern in the graphics command defines an alternating pattern; and replacing the pattern in the graphics command with a glyph.

This method may further comprise rendering the region using the modified graphics command. Preferably the replacing step comprises determining a transparency attribute of the pattern and selecting the glyph having a corresponding transparency from a set of glyphs having a range of transparencies.

According to another aspect of the present disclosure there is provided a method of rendering a region, the method comprising:

receiving a graphics command comprising a drawing operation containing raster data;

calculating spatial frequencies of the raster data;

determining if the calculated spatial frequencies of the raster data in the graphics command defines tiling; and replacing the raster data in the graphics command with smaller raster data and tiling information.

Most preferably the smaller raster data is formed by a tile having equal height and width.

According to another aspect of the present disclosure, there is provided a method of rendering a region, the method comprising:

receiving a graphics command comprising a drawing operation and a pattern of the region defined by a ternary raster operation;

calculating spatial frequencies of the pattern using a Discrete Cosine Transform;

determining if the calculated spatial frequencies of the pattern in the graphics command defines a replicable attribute of the region to be rendered;

replacing at least the pattern in the graphics command with a binary raster operation based on the replicable attribute to form a modified graphics command; and rendering at least the region using the modified graphics command.

Preferably the replicable attribute comprises a constant transparency attribute. Alternatively the replicable attribute may comprise a tiling pattern, and the replacing comprises replacing the pattern with one of a glyph or a raster region having a size smaller than the region.

Advantageously in each of the methods the spatial frequencies are calculated using a Discrete Cosine Transform.

Other aspects are also disclosed.

BRIEF DESCRIPTION OF THE DRAWINGS

At least one embodiment of the present invention will now be described with reference to the drawings in which:

FIGS. 2A and 2B show a respectively zoomed view of pixel output of blended transparency and a corresponding simulated transparency;

FIGS. 13A and 13B show values used in Worked Example 1; and

FIGS. 14A, 14B and 14C show values used in Worked Example 2.

DETAILED DESCRIPTION INCLUDING BEST MODE

Figure 1A:
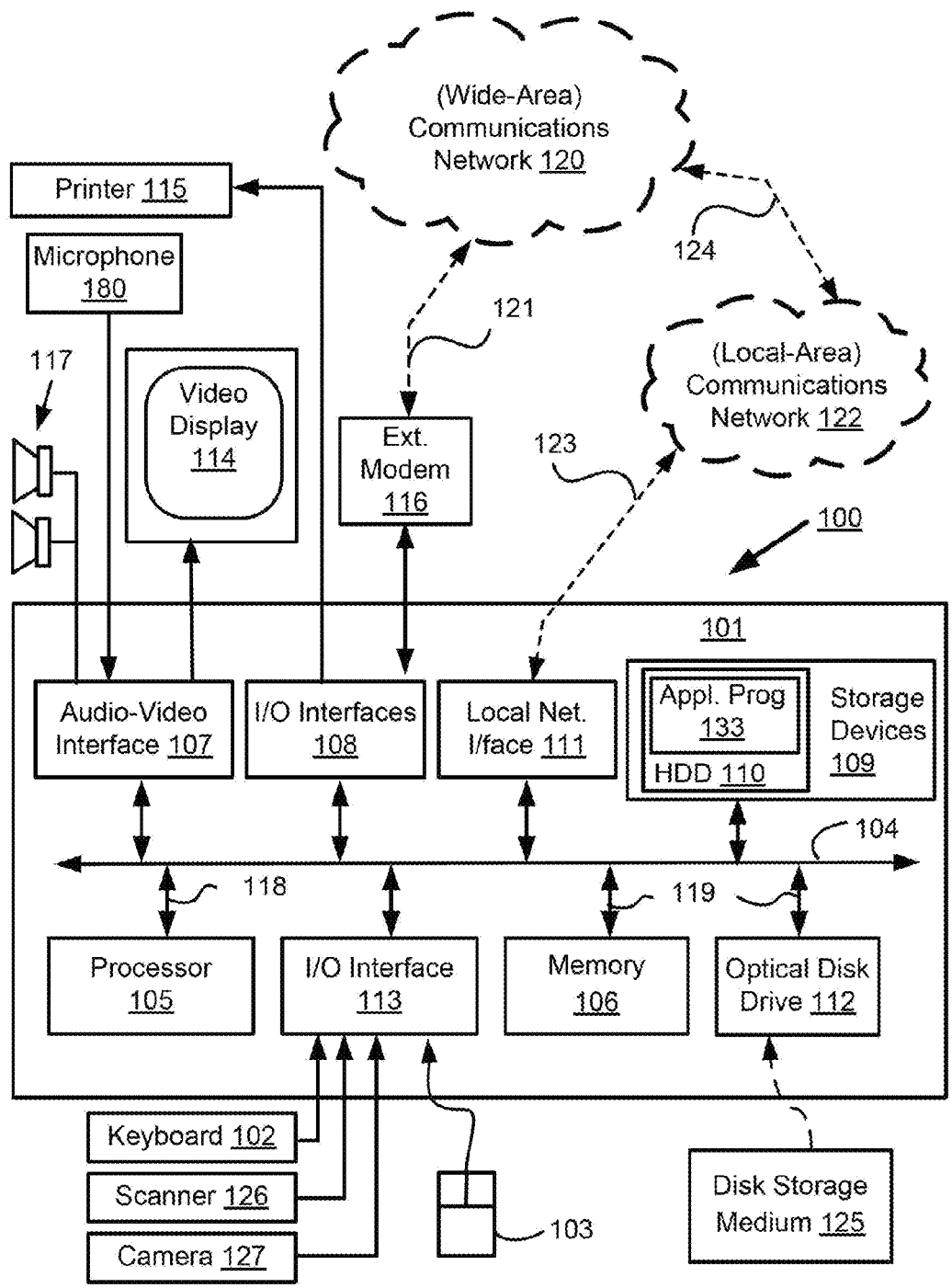
FIGS. 1A and 1B form a schematic block diagram of a general purpose computer system upon which arrangements described can be practiced.
Figure 1B:
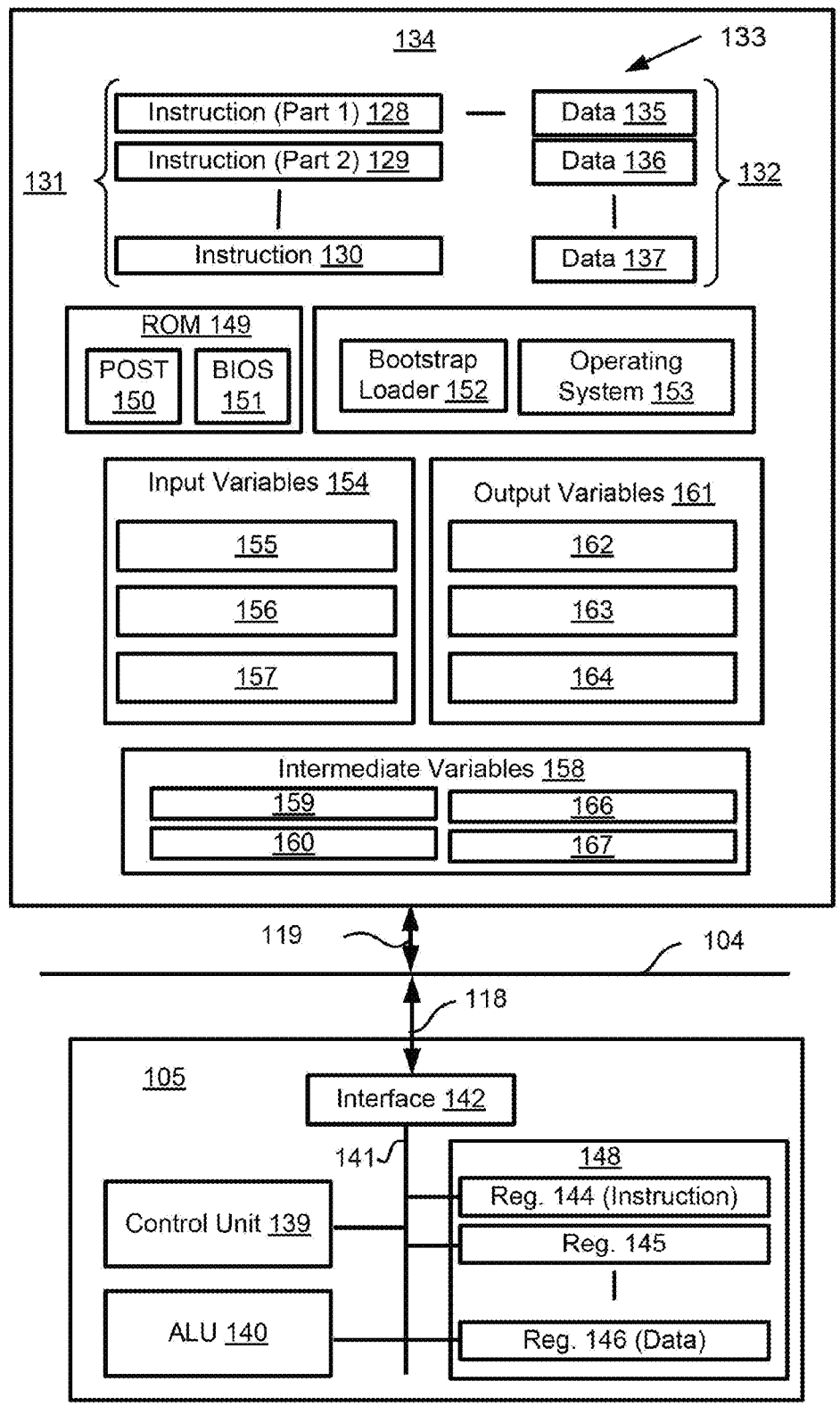

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The rendering of graphical objects to be described may involve rendering to the memory 106, the HDD 110, the display 114, and to the printer 115, or any combination of those destinations.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun SPARCstations, Apple Mac™ or a like computer systems.

The method of rendering may be implemented using the computer system 100 wherein the processes of FIGS. 2 to 10, to be described, may be implemented as one or more software application programs 133 executable within the computer system 100. In particular, the steps of the method of rendering are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the rendering methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for rendering computer graphics.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for rendering computer graphics.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed rendering arrangements use input variables 154, which are stored in the memory 134 in corresponding memory locations 155, 156, 157. The rendering arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(i) a fetch operation, which fetches or reads an instruction 131 from a memory location 128, 129, 130;

(ii) a decode operation in which the control unit 139 determines which instruction has been fetched; and (iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIG. 2 to 10 or 12 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of rendering may alternatively be implemented in dedicated hardware such as one or more integrated circuits performing the functions or sub functions of rendering. Such dedicated hardware may include graphic processors, digital signal processors, or one or more microprocessors and associated memories. Such hardware may be implemented with the computer module 101 or one of the destination devices, such as the display 114 or the printer 115.

Figure 11A:
FIG. 11A shows how transparency simulation is performed in the prior art.

One aspect of the present disclosure operates to detect simulated transparency so the simulated transparency can be removed or replaced with a constant blend coefficient to improve both the intended output and the rendering performance. FIGS. 2A and 2B show the effects of transparency simulation where FIG. 2A represents the desired or intended output, and FIG. 2B shows a simulated output. An object 200 seen in FIG. 2A represents an original appearance to the user. A zoom or enlargement of the object 200 is shown for region 201 as a tile 202. In the tile 202, it can be seen that the object 200 is blended evenly. Object 250 seen in FIG. 2B is the appearance of the object 200 after transparency simulation. A zoom of the object 250 is shown for region 251 as a tile 252. In the tile 252, it can be seen that object 250 has interleaved pixels giving a chequerboard appearance that it is not blended as smoothly as the original object 200. Essentially the result in FIG. 2B is a dithered fill arising from the application of a mask to a fill, as schematically depicted in FIG. 11A.

Transparency simulation uses specific spatial patterns in order to generate a transparency simulation effect. For example, a 50% transparency simulation would have an alternating pattern of one pixel from the object then one pixel from the background, resulting for example in the simple chequerboard appearance seen in FIG. 2B.

Figures 3A, 3B:
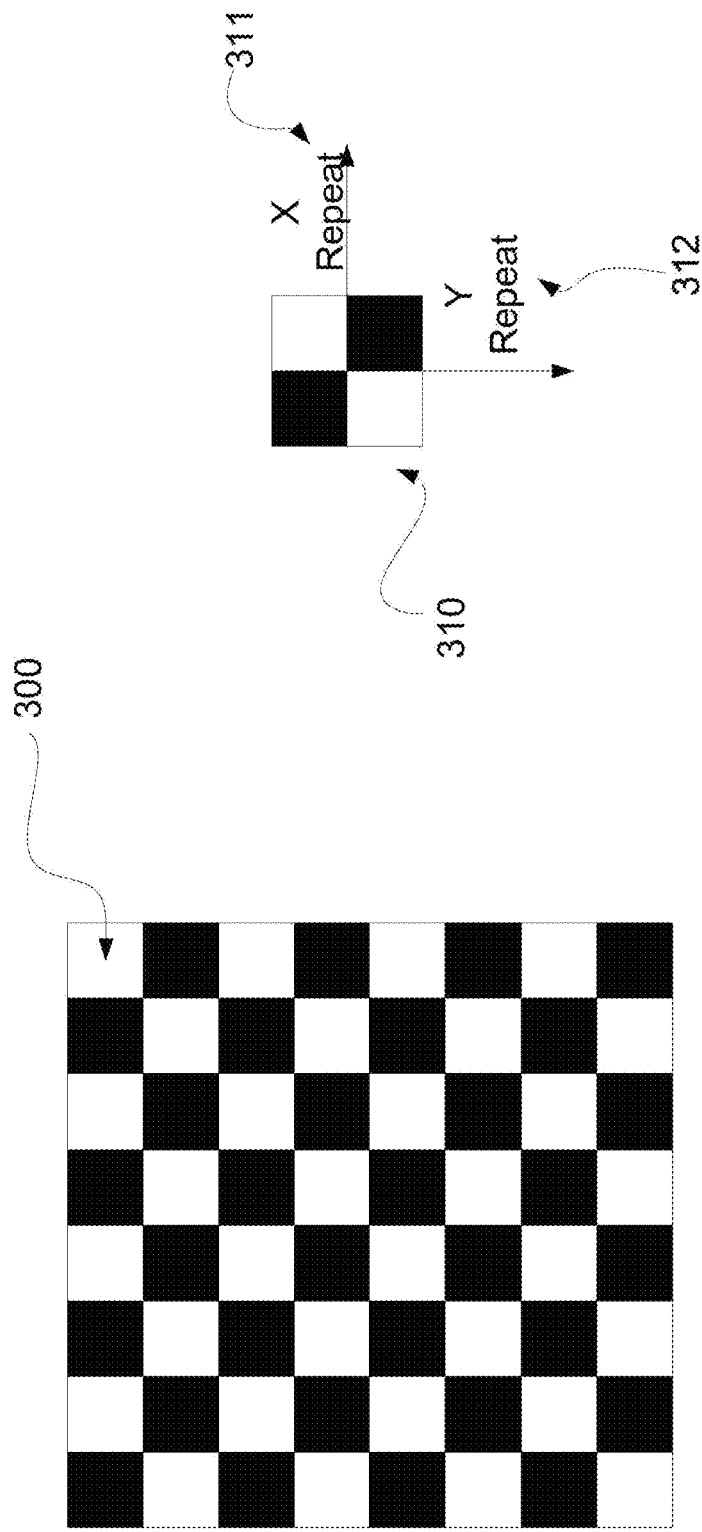
FIGS. 3A and 3B illustrate the reduction of a tiled image.

Another aspect of the present disclosure operates to reduce the memory needed to represent an image. FIGS. 3A and 3B show how an image 300 in FIG. 3A with repeating tiles can be replaced with a smaller image 310 of FIG. 3B with tiling coefficients X 311 and Y 312. The tiling coefficients 311 and 312 define how many iterations the smaller image tile 310 must be tiled in each of the X and Y directions in order to represent the original image 300.

Figure 4:
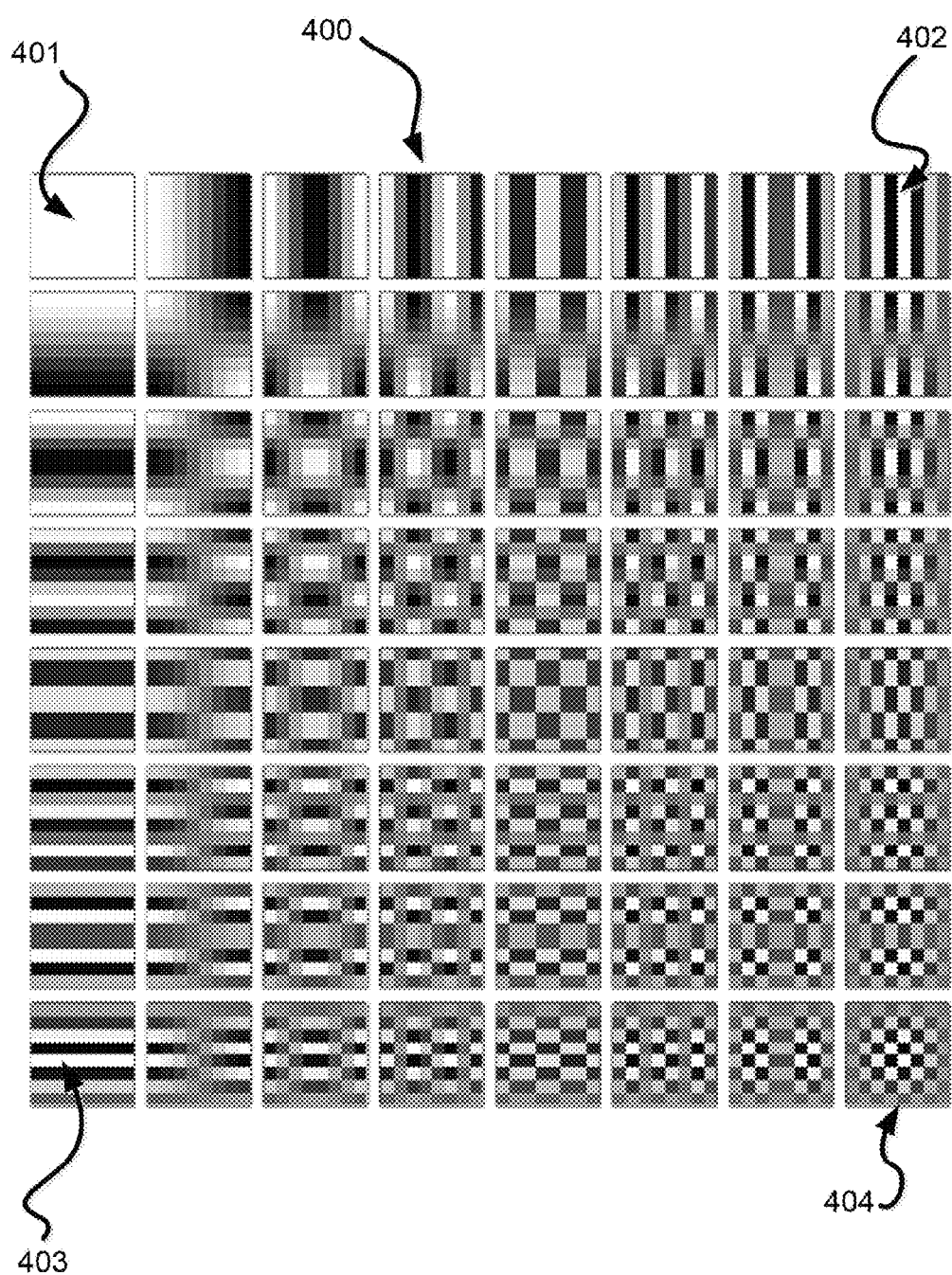
FIG. 4 shows a visual representation of DCT Coefficients.

According to the present disclosure, the DCT is used in both aspects to convert a region of pixels into corresponding spatial frequency components. FIG. 4 shows the DCT frequency components 400 for a region represented by an 8×8 block of pixels. The values in each location in frequency components 400 determine the contribution of the frequency to the region. FIG. 4 shows a DC frequency component 401 which represents the average of the original pixels in the 8×8 block, and is located at location (0, 0) in frequency components 400. Frequency components to the right of DC frequency component 401 contain incrementally more horizontal frequency up to frequency component 402 which is the maximum horizontal frequency for region 400. Frequency components below DC frequency component 401 contain incrementally more vertical frequency up to frequency component 403 which is the maximum vertical frequency for region. Frequency components that are not directly to the right or below DC frequency component 401 contribute to both horizontal and vertical frequencies. Frequency components along the diagonal, from DC frequency component 401 towards a frequency component 404, define proportions in the region that have tiles with equal height and width. Frequency component 404 defines the proportion of the frequency components 400 with the highest resolution of alternating tiles of equal size.

In the process of compressing image data, information about the image can be determined using the DCT. This information is used according to the present disclosure to determine if a transparency simulation effect is present. Since the rendering system typically performs DCT as part of processing input images, DCT for the purpose of detecting transparency simulation does not need to be performed as an additional step. As will be described, this DCT information is used herein to efficiently determine if an image has transparency simulation or image tiling characteristics.

Transparency simulation is accomplished by using a ROP3 0xCA or a ROP3 0xAC operation with a binary pattern mask, where the pattern mask values can only be zero or one. When a binary pattern mask is used with these ROP3 operations, the pattern mask forms a logical map for a particular region—for example, using a ROP3 0xCA operation, where the pattern mask value is one, the source fill will be active, and where the pattern mask value is zero, the destination fill will be active. One common type of pattern mask uses an alternating bitmap—often called a tiled bitmap. An example of a tiled bitmap is a bitmap that forms a checkerboard or sparse checkerboard type pattern. If the ROP3 0xCA or ROP3 0xAC pattern mask is alternating, when the pattern mask is transformed with the DCT, the transformed pattern mask will appear as a 2D sinc function, also known as a "sombrero" function. The detection and position of the sombrero function is used to determine if the pattern mask has transparency characteristics.

Figure 5:
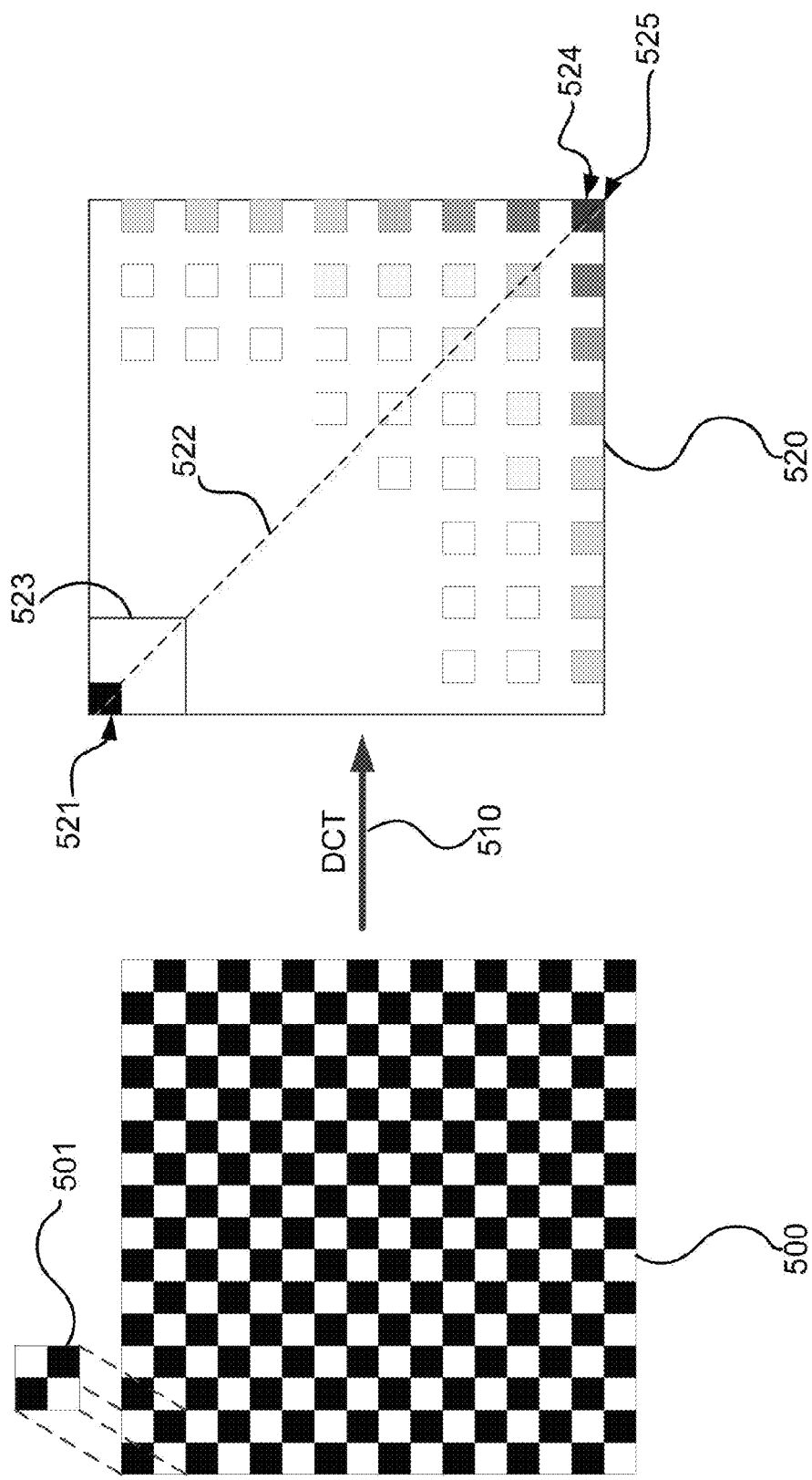
FIG. 5 is a visual representation of conversion of the tiled pattern of FIG. 3A to DCT coefficients.

FIG. 5 shows the properties of the DCT when applied to a tiled bitmap 500, where the bitmap 500 consists of a plurality of regularly space tiles 501. The tiled bitmap 500 is transformed using a DCT 510 into a Transformed Region 520. If the bitmap 500 is a tiled bitmap, then the Transformed Region 520 will exhibit the following characteristics:

(1) A DCT coefficient will have approximately the same value as the corresponding coefficient reflected across the diagonal 522 that separates the bottom left coefficients from the top right; and (2) A peak value 524, not including the DC frequency component 521, will be located along the diagonal line 522, if the component tiles are square.

If the characteristics (1) and (2) above are valid, a square tiled pattern 501 is present in the region 500, and the following can be deduced:

(3) The position of the peak value 524 determines the size of the tiles in the region. The closer the peak value 524 is to bottom right position 525, the smaller the tiles. The closer the peak value 524 is to the DC frequency component 521, the larger the tiles; and (4) For the purposes of transparency simulation, the DC value 521 divided by the width or height of a square region 500 can be used as the constant alpha channel value.

Figure 11B:
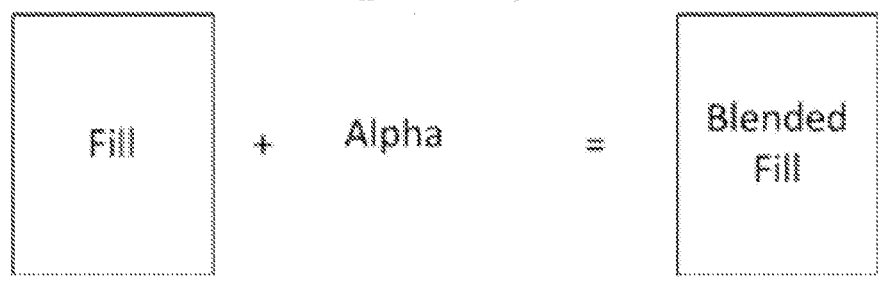
FIG. 11B shows how constant transparency is used to give a blended fill according to the present disclosure.

A such, with reference to FIG. 11B, the mask of the prior art of FIG. 11A can be replaced by a constant alpha value which may then be applied to the fill to give a blended fill according to the present disclosure. Using these tests, by assessing whether the DCT lies substantially on the diagonal 522 of FIG. 5 (i.e. within a predetermined variation or difference therefrom), or a corresponding diagonal of FIG. 4 (not illustrated), such can be used to infer the presence of intended transparency.

In order to qualify detected tiles, a threshold value 523 can be used to determine the maximum tile size allowed for detection. The threshold 523 is used to determine the size of the tiles to detect. The distance of the peak value 524 from the DC value 521 is inversely proportional to the size of the detected tiles.

Figure 6:
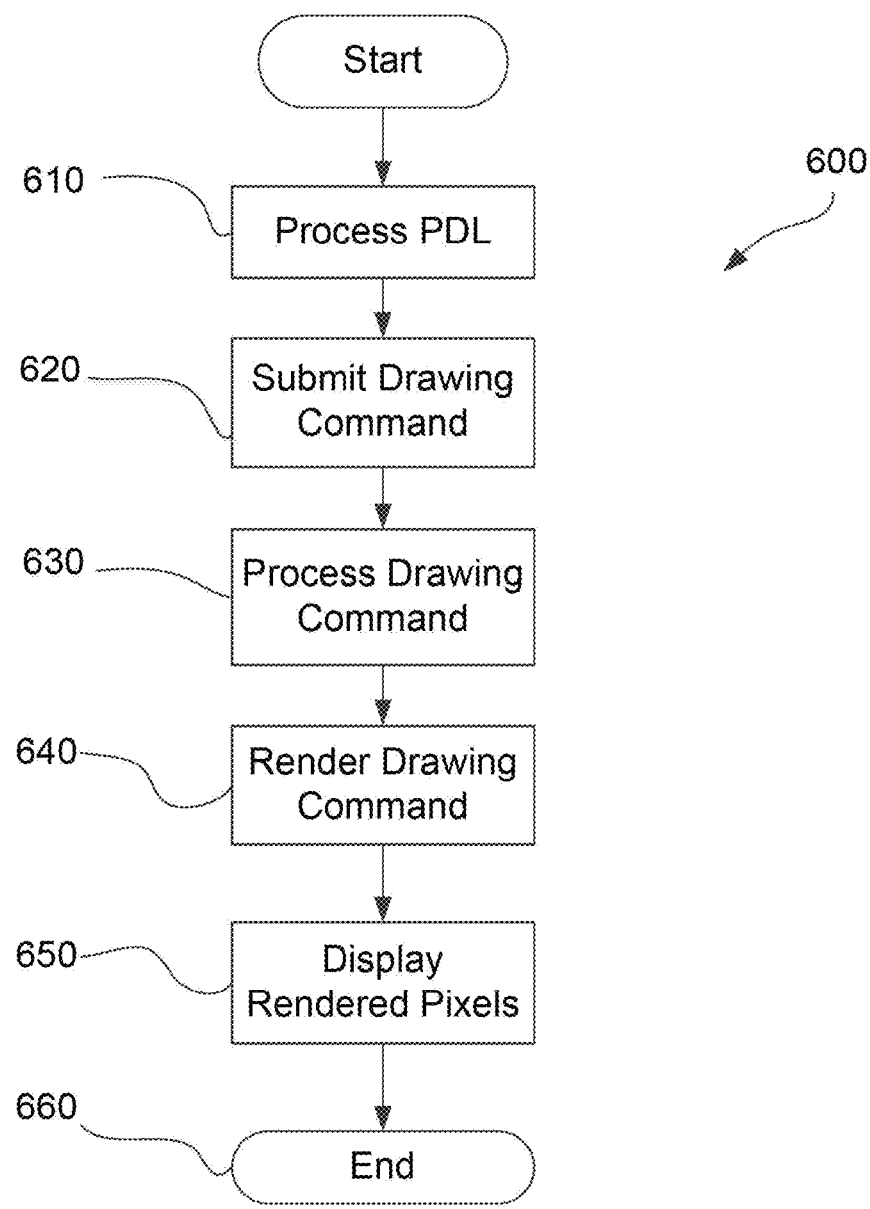
FIG. 6 is a Rendering Sequence Diagram.

A typical sequence 600 for operation of a graphics rendering system is shown in FIG. 6 including steps 610 to 660. The rendering sequence 600 is typically performed in one of two ways. In a first approach, steps 610-630 are processed in the computer module 101, whether a PC or server, and more specifically by the processor 105 executing those steps, and steps 640-650 are processed at the printer 115, typically by an embedded processor thereof. In a second approach, all substantive steps 610-650 are processed at the printer 115, again generally by an embedded processor.

The sequence 600 begins with a Process PDL step 610. In the Process PDL step 610, the PDL is interpreted by a PDL Interpreter and divided into a sequence of one or more of drawing command(s). A drawing command is used to indicate that a graphic object should be rendered to an output form for reproduction by the printer 115 or the display 114. The sequence 600 then progresses to a Submit Drawing Command step 620 where the PDL interpreter submits drawing command(s) to the renderer. The drawing commands may be processed and rendered immediately or stored in a display list for later rendering in bulk. Next, the sequence 600 progresses to a Process Drawing Command step 630. In the Process Drawing Command step 630, the or each drawing command is analysed by the renderer and converted into native drawing commands. This process typically involves pre-calculating rendering coefficients, processing image data using DCT and compression, and optimising commands, including detecting commands that do not affect the output and removing such commands. The sequence then progresses to a Render Drawing Command step 640, which operates to render the drawing command into pixels. The sequence 600 then progresses to a Display Rendered Pixels step 650, where the rendered pixels are displayed, which typically involves reproducing the pixels on hard copy media by the printer 115. After step 650, the rendering sequence 600 terminates at step 660.

Figure 7:
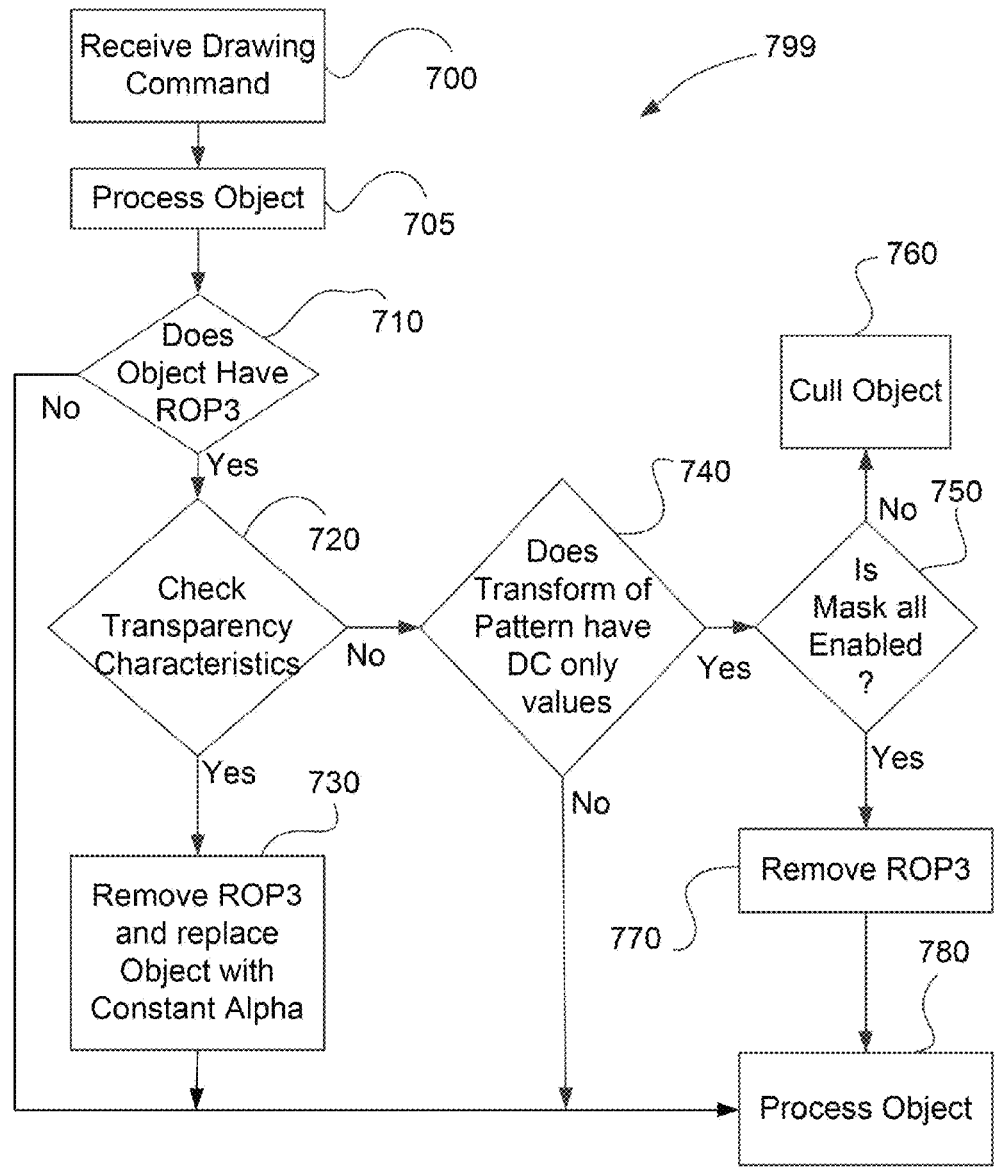
FIG. 7 is a flowchart of a method to determine if a graphic command is using a ROP3 to simulate transparency.

In one implementation, the rendering sequence 600 receives a Drawing Command from a PDL interpreter. FIG. 7 shows a subset or part 799 of the Process Drawing Command step 630 in detail. The sequence of the part 799 is used to determine if a graphic command is using a ROP3 to simulate transparency. The sequence 799 starts at the Receive Drawing Command step 700, where a drawing command is received from the PDL interpreter. Then a process object step 705 operates to process the drawing command into a graphical drawing object. In step 705, raster data, including ROP3 pattern masks, are converted using DCT and compressed to reduce memory usage. In another example, a ROP3 pattern mask in the drawing command from the PDL interpreter can be configured with the JPEG format in which case the spatial frequency components are obtained from DCT values in the ROP3 pattern mask with JPEG format. The graphical object is processed in a Does Object have ROP3 decision step 710. If step 710 determines the Object does not have a ROP3 0xCA or ROP3 0xAC, then the sequence continues to a Process Object step 780 and the graphic object is then rendered by the sequence 600 according to step 640. As the sequence 799 is only part of the step 630, other processes not associated with the focus of the present disclosure may be performed in step 630 to influence the drawing command to be rendered in step 640.

If step 710 determines the object has a ROP3 command, a Check Transparency Characteristics step 720 is then performed. If step 720 determines that the transformed pattern, associated with the object as processed at step 705, does have transparency characteristics, a Remove ROP3 and replace Object with Constant Alpha step 730 is performed. After the object is replaced with constant alpha in step 730, the object will be processed by the rendering system as an alpha blended object and rendered accordingly in step 780 as a binary ROP.

If step 720 determines that the transformed pattern does not have transparency characteristics, the sequence 799 proceeds to a Does Transform of Pattern have DC only Values check step 740. Step 740 is performed to determine if the pattern is fully opaque or fully transparent, by virtue of only a DC component. If step 740 determines that the pattern contains values other than DC values, then the object is rendered normally by the system, according to step 780. However, if the Pattern is only DC values, an Is Mask all Enabled checking step 750 is performed. If step 750 determines that the mask is fully opaque, the sequence 799 performs a Remove ROP3 step 770 thus causing the object to drop the Pattern and become a simple opaque shape which uses the ROP2 COPYPEN operation—this operation simply paints the source fill within the object bounds. If step 750 determines that the mask is fully transparent, the sequence proceeds to a Cull Object step 760 and the object can be completely removed from the render/display list as it need not be rendered. The Process Object step 780 may then occur. In this implementation, step 780 results in the object being rendered to pixels.

Figure 8:
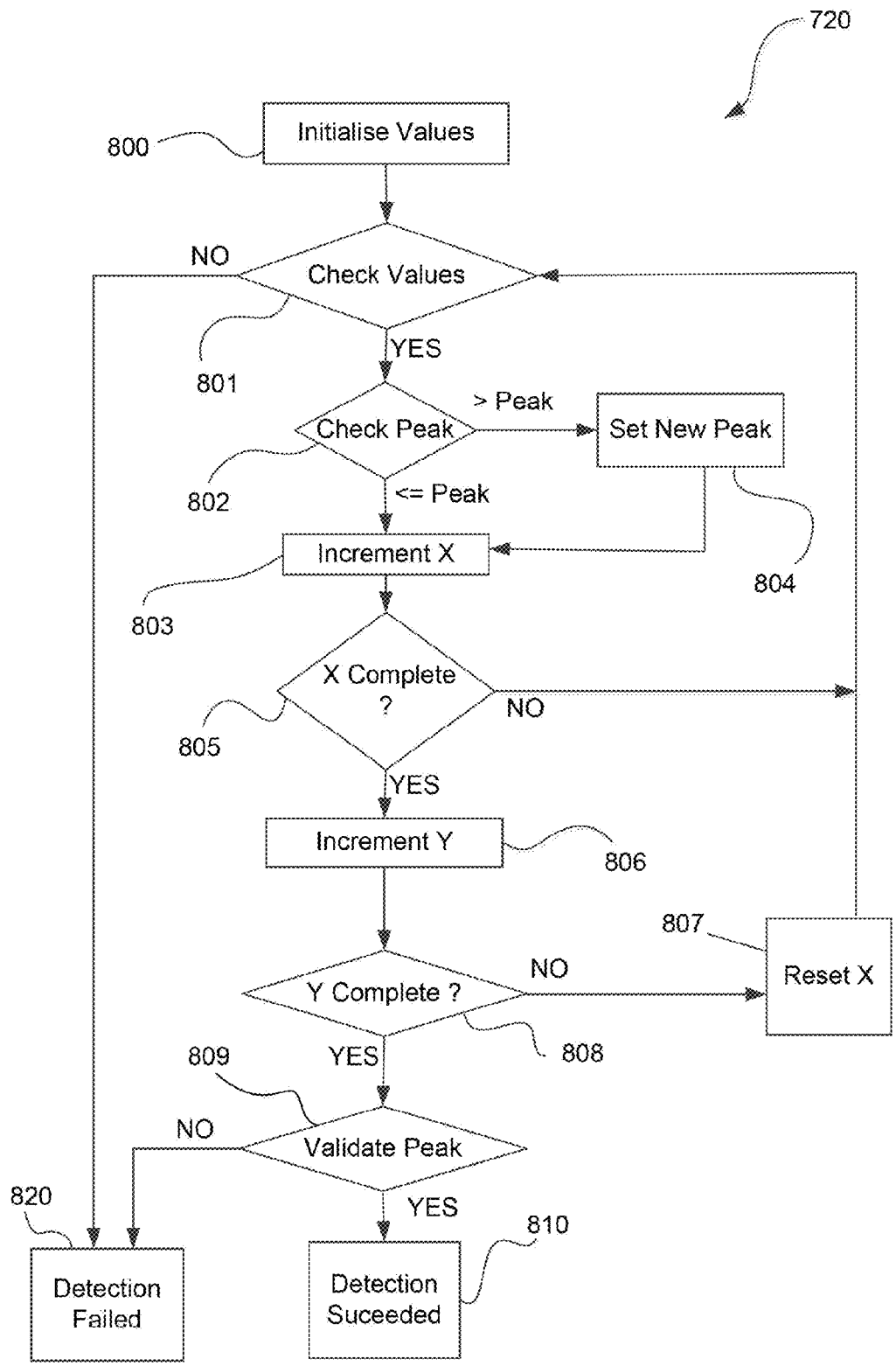
FIG. 8 is a detailed flowchart of the detection of transparency/tiling in the method of FIG. 7.
Figure 9:
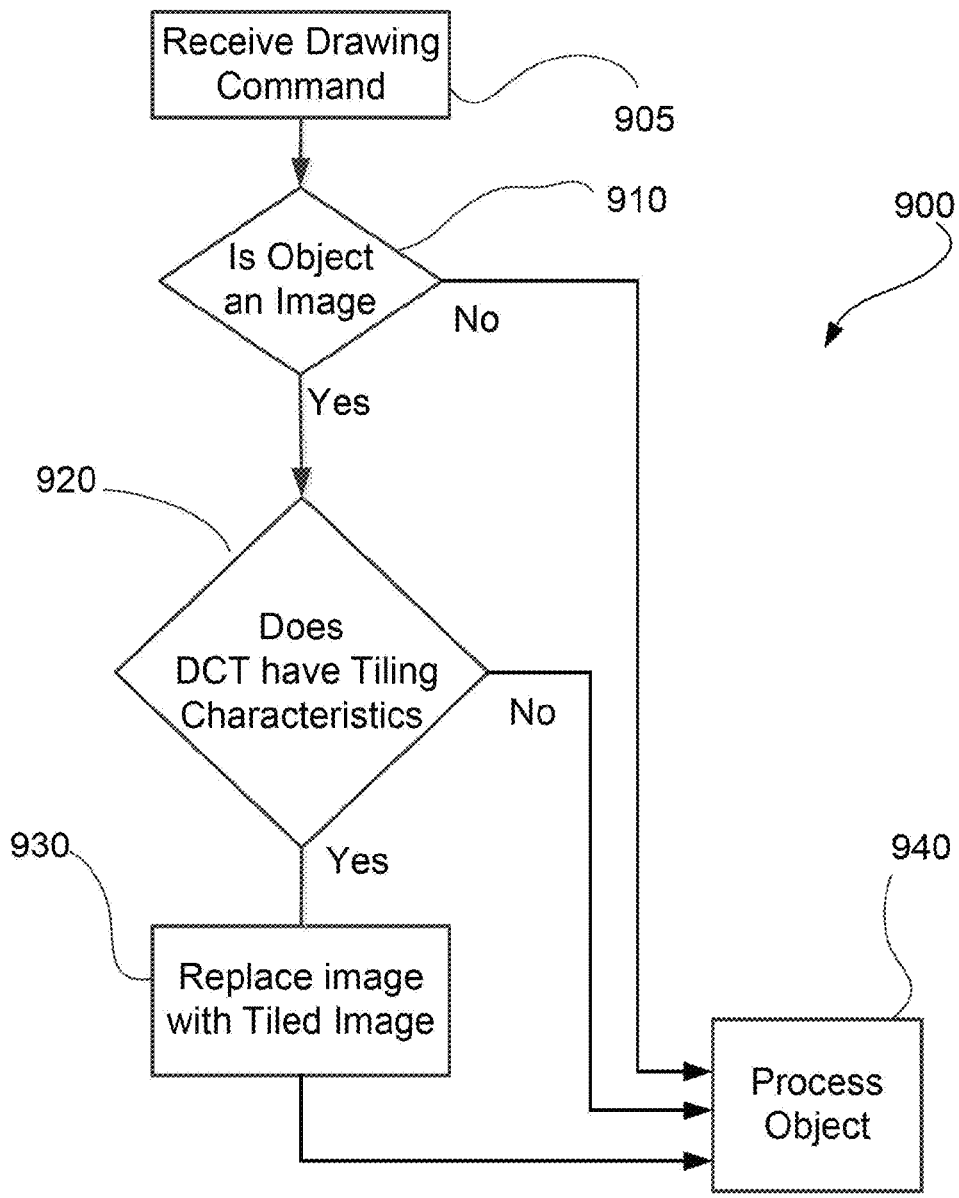
FIG. 9 is a flowchart of tile image detection.

Step 720 from FIG. 7 is preferably accomplished by a method shown in FIG. 8, typically executed in software by the processor 105. It is assumed that at this point the DCT has already been performed from step 705 in FIG. 7. The method in FIG. 8 contains 4 variables: X, Y, CUR_PEAK (CP), a current peak value, and PEAK_LOC (PL), the location of the current peak. The method 720 in FIG. 8 is given the DCT of part of the object being processed. The sequence in FIG. 8 begins with an Initialise values step 800 where the variables are set as follows: X=1, Y=0, CP=0, PL=(0, 0). The sequence 720 progresses to a Check Values decision step 801. In step 801, the DCT values are checked by comparing DCT(X, Y) with DCT(Y, X) and ensuring the difference between these values is less than a predefined value. If decision step 801 fails, meaning the difference is larger than the predefined value, then the DCT value is not considered to be substantially on the diagonal as shown in FIG. 4 or FIG. 5, and the detection (of transparency or tiling) is considered a failure and the sequence progresses to the Detection Failed step 820, equivalent to step 720. For example, if a drawing command to be processed is for a dashed line along X or Y direction spatially, the difference between a DCT value for X direction and a DCT value for Y direction should be large enough. In this case, the ROP3 as a raster operation associated with the drawing command for the dashed line is not removed and is not replaced with constant Alpha.

If the decision step 801 succeeds, the sequence progresses to the Check Peak step 802. In step 802, the stored value in CP is compared to the absolute value of DCT(Y, X). If the absolute value of DCT(Y, X) is greater than CP, the sequence progresses to the Set New Peak step 804. If the absolute value of DCT(Y, X) is not greater than CP, the sequence progresses to an Increment X step 803. In the Step New Peak 804 step, the value at DCT(Y, X) is stored in CP, and PL is set to (Y, X). The Increment X step 803 adds one to the value of X, and then the method 720 progresses to an X Complete decision step 805. Decision step 805 determines if the value of X is equal to the width of the DCT given. If the value of X is equal to the width of the DCT, the sequence 720 progresses to an Increment Y step 806. If the value of X is less than the width of the DCT, the sequence 720 returns to the Check Values decision step 801. Step 806 adds one to the value of Y and the sequence 720 progresses to a Y Complete decision step 808. Decision step 808 determines if the value of Y is equal to the height of the DCT given. If the value of Y is equal to the height of the DCT, the sequence 720 will progress to a Validate Peak step 809. If the value of Y is less than the height of the DCT, the sequence progresses to a Reset X step 807.

In the Reset X step 807, the value in X is set to the value stored in Y, then the sequence 720 returns to the Check Values step 801. Steps 802 to 808 are thus operative to refine the tile size to thus provide for the most efficient or optimised (largest) tile size or corresponding transparency value.

In the Validate Peak step 809, two criteria must be met: (1) The difference between PL.X and PL.Y must be 1 or less; and (2) PL should be some threshold away from location (0, 0). This threshold may be determined by the user and/or the purpose of the detection. The closer the threshold to (0, 0), then the larger the tile size that this detection method is able to be detect. However, if all tiles are to be detected, the second criteria can be ignored. If the Validate Peak step 809 determines the detection is successful, the sequence 720 progresses to the Detection Succeeded step 810, corresponding to step 720—Yes. If the Validate Peak step 809 determines the detection is not successful, the sequence progresses to the Detection Failed step 820.

The above described sequence can also be shown using the following Pseudo code:

```
CP = 0
PL = (0,0)
X = 1
Y = 0
LOOP:
  LOOP:
    Difference = DCTyx − DCTxy
    If ABS(Difference) > MAX_TOLERANCE:
      Detection failed.
    If DCTxy >CP:
      CP = DCTxy
      PL = (X,Y)
    X = X + 1
  While X < tilewidth
  Y = Y + 1
  X = Y
While Y < tile height
If DISTANCE(PL − (0,0)) > TILE_THRESHOLD
  AND
  ABS(PL.X − PL.Y) <= 1:
    Detection successful
Else:
    Detection failed
```

Once detection in step 720 has been completed, and if successful (Yes), according to the present disclosure, an alpha value can be determined and used to replace the pattern. The alpha value is the proportion of the DC value (0, 0) of the DCT, being:

$$\alpha = \frac{DCT(0, 0)}{Width} \quad \text{Equation 3}$$

Worked Example 1

Starting from FIG. 6, the PDL Interpreter processes the PDL in step 610. PDL interpreter submits Drawing command in step 620. In this example, the drawing command contains ROP3 CA with the pattern mask as shown in FIG. 13A.

The Process drawing command step 630 converts the pattern mask of FIG. 13A using DCT from Equation 2, to obtain the absolute values shown in FIG. 13B.

Starting on Initialise Values step 800, values are initialised:
Y=0
X=1
CP=0
PL=(0,0).

Since the process of this is very repetitive, only selected values of X and Y will be used for this example.

At the location (1, 1), this example gives the following values:
X=1, Y=1, CP=0, PL=(0, 0).
Check the values at step 801 of DCT(Y, X) with DCT(X, Y)
CT(Y=1, X=1)=0.1
Since the values are the same, process then checks the peak value at step 802.
CP is 0.0
DCT(1, 1) is 0.1
Since the value in the DCT is larger than CP, we must store the location and value at step 804:
CP is set to 0.1
PL is set to (1, 1).
Increment X to 2 at step 803.
X is not complete at step 806, and so processing continues to step 801.

At the location (3, 15), the example gives the following values:
X=15, Y=3, CP=0.6, PL=(1, 15).
Step 801 checks the values of DCT(Y, X) with DCT(X, Y)
DCT(X=15, Y=3)=0.7
DCT(Y=3, X=15)=0.7.
Since the values are the same, the process then checks the peak value at step 802.
CP is 0.6
DCT(3, 15) is 0.7
Since the value in the DCT is larger than CP, step 804 operates to store the location and value:
CP is set to 0.7
PL is set to (3, 15).
Step 803 then increments X to 16.
Step 805 determines X is now complete, and thus Y must be incremented to 4 according to step 804.
Step 808 determines Y is not complete, and the process continues to steps 807 and 801.

At the location (5, 15) this example reveals the following values:
X=15, Y=5, CP=0.7, PL=(3, 15)
Step 801 checks the values of DCT(Y, X) with DCT(X, Y)
DCT(X=15, Y=5)=0.7
DCT(Y=5, X=15)=0.7
Since the values are the same, the process then checks the peak value at step 802:
CP is 0.7
DCT(5, 15) is 0.7
Since the value in the DCT is not larger than CP, nothing is changed.
Increment X to 16 at step 803
X is now complete according to step 805; Y must be incremented to 6 at step 806.
Y is not complete at step 808, and so the process continues via steps 807 and 801.

At the location (15, 15), the example gives the following values:
X=15, Y=15, CP=2.2, PL=(13, 15)
Step 801 checks the values of DCT(Y, X) with DCT(X, Y)
DCT(X=15, Y=15)=6.5
DCT(Y=15, X=15)=6.5
Since the values are the same, the process then checks the peak value at step 802.
CP is 2.2
DCT(3, 15) is 6.5
Since the value in the DCT is larger than CP, the process stores the location and value at step 804:
CP is set to 6.5
PL is set to (15, 15)

Increment X to 16 at step 803

X is now complete at step 805; Y is incremented to 16 at step 806.

Y is complete at step 808; and so the process goes to the Validate Peak step 809.

For the Validate Peak step 809, the following values are present:

PEAK_VAL=6.5

PL=(15, 15)

The Validate Peak step 809 checks if the difference between PL.X and PL.Y is 1 or less. In this case, the difference is 0. Step 809 also ensures the PL is above a predetermined threshold. The threshold for this example is 10. In this case, both PL.X and PL.Y are greater than 10, therefore the detection is successful, corresponding to step 810, being 720—Yes. For this Worked Example, the α value can be determined by using Equation 3. Here the DCT(0, 0) was 8.0, and the width was 16. Therefore α=0.5.

The threshold is typically simply set depending on the limit of the largest repeating tile the process is required to detect. The threshold may also depend on the input area width and height. The threshold number is generally closer to the input width/height for simulated transparency detection, and can be smaller for large repeating tile detection. For the present example (transparency detection), the threshold is simply set to 10 based on the input width/height of 16. (End Worked Example 1)

Figure 11C:
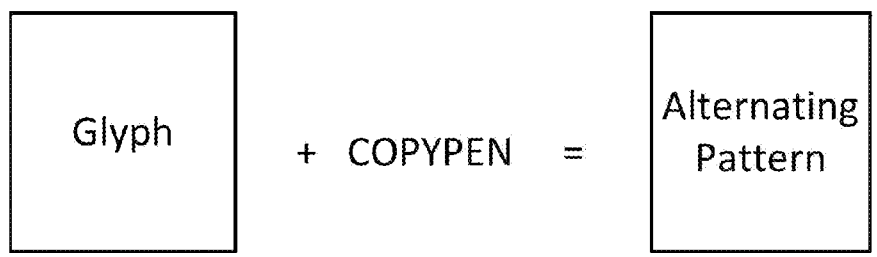
FIG. 11C shows how an alternating pattern can be rendered using a glyph.

As noted above, another aspect of the present disclosure is that the detection method described above can be used to detect an alternating pattern. This can be used to simplify the graphics commands. An example of an image containing an alternating pattern would be an 8×8 checkerboard image—this consists of a repeating 2×2 pixel pattern. As will be appreciated from the above description and particularly that of step 720 in FIG. 8, a successfully validated peak at step 810 is in itself a detection of an alternating pattern, in this case a square tiled pattern of maximal size, obtained through incrementing X and Y, associated with the corresponding peak. Once the alternating pattern has been detected, in this aspect, the alternating pattern can be replaced by a glyph, which is the same dimensions as the detected tile, and which may use less memory and/or be easier to render. This is schematically represented in FIG. 11C. In order to achieve correct output, the tile may need to be scaled to page resolution prior to conversion into the glyph.

Figure 12:
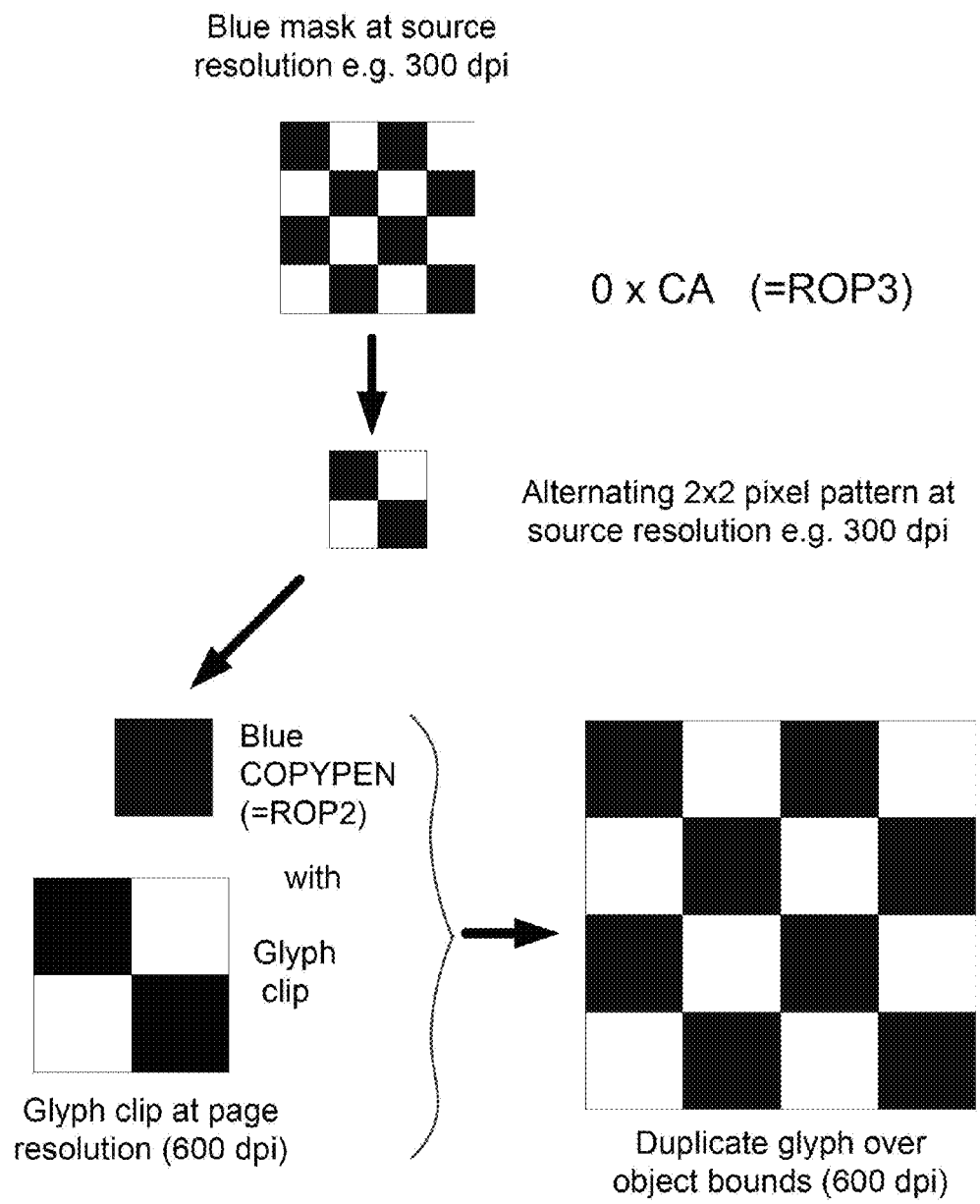
FIG. 12 shows an example of how a glyph may be used to simulate transparency.

An example of this approach is illustrated in FIG. 12. Here a mask formed by an alternating blue chequerboard pattern at a source resolution of 300 dpi. This pattern would normally be implemented using a ROP3 0xCA instruction. However, according to this aspect the instruction is replaced by a Blue COPYPEN (ROP2) instruction and a glyph clip object. The glyph clip forms a corresponding mask at 600 dpi. The glyph clip object in this example corresponds to the alternating pattern component derived at step 810 as discussed above. Accordingly, the rendering essentially provides for a copying or duplication of the blue tile glyph across the page to thus simulate the alternating pattern.

More specifically, in implementation of this aspect, the Renderer receives a graphics object from a PDL Interpreter. From FIG. 6, a subset of the Process Drawing Command step 630 is explained in detail in FIG. 9, which shows a processing sequence 900 used to determine if an image is tiled and can be replaced with a smaller tiled image. The sequence 900 starts at the Receive Drawing Command step 905, where a drawing command is received from the PDL interpreter. The Drawing command is processed in an Is Object an Image decision step 910. If step 910 determines the Object is not an image (the object is for example a text object), then the sequence continues to Process Object step 940 and the object is rendered by the system unchanged. If step 910 determines the object is an image, and thus formed by raster data, a Does DCT have Tiling Characteristics step 920 is then performed. If step 920 determines that the DCT does have tiling characteristics, then a Replace Image with Tiled Image step 930 is performed. In step 930, the raster data image is replaced with a tiled image form of tiles replication content of the raster data, and consequently the replace tiled image is processed by the system according to step 940 as a smaller tiled image and rendered accordingly. The Does DCT have Tiling Characteristics step 920 is essentially performed using the method of FIG. 8, in a manner similar to Transparency Simulation detection. However, the tile size threshold is ignored. In this implementation, once the sequence 720 in FIG. 8 is complete and if detection is successful, the size of an individual tile can be determined by the location of PL.

$$\text{tile\_size} = \frac{\text{width}}{(PL.X + 1)} \quad \text{Equation 4}$$

$$\text{repetitions} = \frac{\text{width}}{2 \times \text{tile\_size}} \quad \text{Equation 5}$$

Using the above equation, tile sizes that are integer tiling factors of the width can be accurately detected.

However, examining the neighbouring values to the peak location and using their magnitude as a weighted average, can alternatively be used to determine a non-integer $PL_{REAL}$ value. The pair of Equations 6 below gives a mathematical expression to determine the non-integer Peak Location.

$$PL_{REAL}.X = \frac{1}{\sum_{i=-1}^{1} DCT(PL.Y, PL.X + i)} \sum_{i=-P}^{P} DCT(PL.Y, PL.X + i)X \quad \text{Equations 6}$$

$$PL_{REAL}.Y = \frac{1}{\sum_{i=-1}^{1} DCT(PL.Y + i, PL.X)}$$

$$\sum_{i=-P}^{P} DCT(PL.Y, +iPL.X)X$$

The non-integer peak location can then be used in Equation 4 and Equation 5.

Once the tiling size and repetitions have been found, two values must be determined; Value A and Value B, which are the two values that are alternating in the image. Value A can be determined by sampling the image at location (0,0) and Value B can be determined by sampling the image at (0, tile_size).

Figure 10:
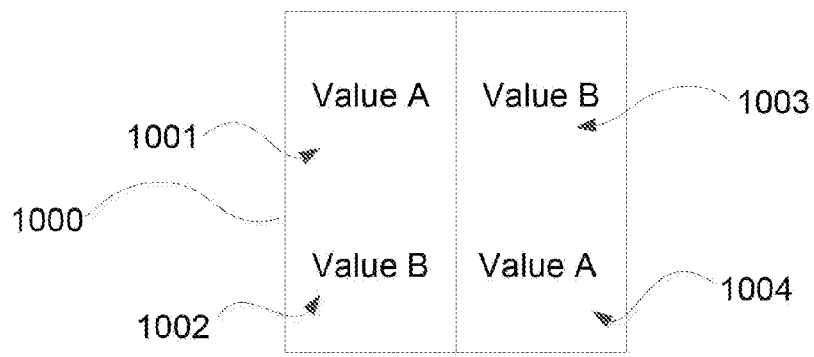
FIG. 10 illustrates a pattern used to create tile.

The tiled image must have 4 tiles to repeat as the original. FIG. 10 shows the pattern used for the smaller image to represent the larger image. Tiled image 1000 is composed of a tile 1001 on the top left containing Value A, a tile 1003 on the top right containing Value B, a tile 1002 on the bottom left containing Value B, and a tile 1004 on the bottom right containing Value A.

Worked Example 2

Given the ROP3 pattern mask shown in FIG. 14A, and given the DCT converted absolute values shown in FIG.

14B, following the steps from Worked Example 1, it is possible to determine that the DCT has symmetric values along the diagonal, and the CP=4.3 and PL=(3, 3). It can be seen by applying Equation 4, that the tile_size is determined to be 4 and by applying Equation 5 the repetition is 2. It can also be seen that Value A (0, 0) has value 1.0 and Value B (0, 4) has value 0.0. Following FIG. 10, the replaced tiled image would be that shown in FIG. 14C with 2 repetitions in Horizontal and Vertical directions. (End Worked Example 2)

In this aspect, transparency can be achieved using a set of glyphs for each of a set of desired transparencies. For example, a pattern with a transparency attribute >50%, can be simulated by replicating a glyph having a corresponding 50% transparency, selected from a set of corresponding glyphs but having a range of transparencies.

INDUSTRIAL APPLICABILITY

The arrangements described are applicable to the computer and data processing industries and particularly for the modifying of graphics commands to assist in the rendering of regions, particularly for improving output images where otherwise simulated transparency or for rending alternating patterns. Rendering may be performed to a printer, a display, or to a memory for subsequent reproduction.

The foregoing describes only some embodiments of the present invention, and modifications and/or changes can be made thereto without departing from the scope and spirit of the invention, the embodiments being illustrative and not restrictive.

What is claimed is:

1. A method of modifying a graphics command, the method comprising:
   receiving from a computerized graphical interface a graphics command comprising a drawing operation in a region and a pattern of the region;
   obtaining transparency characteristics from a frequency representation of the pattern;
   determining if the obtained transparency characteristics satisfy a set of transparency criteria; and
   replacing at least the pattern with a transparency coefficient based on the frequency representation if the obtained transparency characteristics satisfy the set of transparency criteria.

2. The method according to claim 1 further comprising rendering the region using the transparency coefficient.

3. The method according to claim 1, wherein the replacing comprises replacing the graphics command with a binary raster operation where a fill has a determined transparency value applied.

4. The method according to claim 1, where the frequency representation is calculated using a Discrete Cosine Transform.

5. The method according to claim 1, wherein the replacing comprises determining that the transparency coefficient is transparent, and then removing the graphics command.

6. The method according to claim 1, wherein the replacing comprises determining that said transparency coefficient is opaque, and then removing the pattern thus modifying the object to be an opaque shape.

7. A method of modifying a graphics command, said method comprising:
   receiving from a computerized graphical interface a graphics command comprising a drawing operation in a region and a raster operation pattern of the region;
   obtaining alternation characteristics from a frequency representation of the pattern;
   determining if the obtained alternation characteristics satisfy a set of alternation criteria; and
   replacing the pattern with a glyph if the obtained alternation characteristics satisfy the set of alternation criteria.

8. The method according to claim 7, further comprising rendering the region using the glyph.

9. The method according to claim 7, where the frequency representation is calculated using a Discrete Cosine Transform.

10. The method according to claim 7 wherein the replacing comprises determining a transparency attribute of the pattern and selecting the glyph having a corresponding transparency from a set of glyphs having a range of transparencies.

11. A method of rendering a region, the method comprising:
    receiving from a computerized graphical interface a graphics command comprising a drawing operation containing raster data;
    obtaining tiling characteristics from a frequency representation of the raster data;
    determining if the obtained tiling characteristics satisfy a set of tiling criteria; and
    replacing the raster data with smaller raster data and tiling information if the obtained tiling characteristics satisfy the set of tiling criteria.

12. The method according to claim 11, where the frequency representation is calculated using a Discrete Cosine Transform.

13. The method according to claim 11, where the smaller raster data is formed by a tile having equal height and width.

14. A method of rendering a region, the method comprising: receiving from a computerized graphical interface a graphics command comprising a drawing operation in a region and a pattern of the region defined by a ternary raster operation; obtaining a frequency representation of the pattern using a Discrete Cosine Transform; determining replication characteristics from the frequency representation; determining if the determined replication characteristics satisfy a set of replication criteria; replacing at least the pattern with a binary raster operation based on the determined replication characteristics to form a modified graphics command; and rendering at least the region using the modified graphics command.

15. The method according to claim 14 wherein the determined replication characteristics comprises a constant transparency attribute.

16. The method according to claim 14 wherein the determined replication characteristics comprise a tiling pattern, and the replacing comprises replacing the pattern with one of a glyph or a raster region having a size smaller than the region.

* * * * *